(12) United States Patent
Yao et al.

(10) Patent No.: US 10,565,218 B2
(45) Date of Patent: Feb. 18, 2020

(54) INTERACTIVE SEQUENTIAL PATTERN MINING

(71) Applicant: ENTIT SOFTWARE LLC, Sanford, NC (US)

(72) Inventors: Wen Yao, San Diego, CA (US); Mehran Kafai, Redwood City, CA (US); April Slayden Mitchell, San Jose, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 242 days.

(21) Appl. No.: 15/325,493

(22) PCT Filed: Aug. 18, 2014

(86) PCT No.: PCT/US2014/051408
§ 371 (c)(1),
(2) Date: Jan. 11, 2017

(87) PCT Pub. No.: WO2016/028252
PCT Pub. Date: Feb. 25, 2016

(65) Prior Publication Data
US 2017/0161337 A1   Jun. 8, 2017

(51) Int. Cl.
*G06F 16/2458* (2019.01)
*G06F 16/26* (2019.01)
(Continued)

(52) U.S. Cl.
CPC ........ *G06F 16/2465* (2019.01); *G06F 16/248* (2019.01); *G06F 16/2474* (2019.01); *G06F 16/24578* (2019.01); *G06F 16/26* (2019.01)

(58) Field of Classification Search
CPC ........ G06F 17/30539; G06F 17/30554; G06F 17/30572; G06F 17/30548; G06F 17/3053;
(Continued)

(56) References Cited

U.S. PATENT DOCUMENTS 6,473,757 B1 * 10/2002 Garofalakis ...... G06F 17/30404
6,687,693 B2    2/2004 Cereghini et al.
(Continued)

OTHER PUBLICATIONS

Perer, Adam et al., "Frequence: interactive mining and visualization of temporal frequent event sequences," In: Proceedings of the 19th International Conference on Intelligent User Interfaces (IUI '14), pp. 153-162, Feb. 24-27, 2014. (Year: 2014).*
(Continued)

*Primary Examiner* — James Trujillo
*Assistant Examiner* — Michal Bogacki

(57) ABSTRACT

Interactive sequential pattern mining is disclosed. One example is a system including a sequence miner, and an interaction processor. A sequence database is received, the sequence database including a plurality of input sequences, where each sequence of the plurality of input sequences is an ordered list of events, and each event in the list of events includes at least one item. The sequence miner mines the sequence database for a plurality of candidate sequence patterns, the mining based on an interaction with a user. The interaction processor processes the interaction with the user, the interaction based on domain relevance of the plurality of candidate sequence patterns to the user.

19 Claims, 9 Drawing Sheets

(51) Int. Cl.
*G06F 16/248* (2019.01)
*G06F 16/2457* (2019.01)

(58) Field of Classification Search
CPC ......... G06F 17/30867; G06F 17/30404; G06F 7/02; G06F 21/552; G06F 16/2465; G06F 16/26; G06F 16/24578; G06F 16/2474; G06F 16/248; G06Q 30/02; G06Q 30/0201; G06N 99/005
See application file for complete search history.

(56) References Cited

U.S. PATENT DOCUMENTS

| | | | |
|---|---|---|---|
| 6,754,388 B1* | 6/2004 | Foslien | G06F 17/30539 382/209 |
| 7,539,677 B1 | 5/2009 | Wong et al. | |
| 7,979,362 B2* | 7/2011 | Zhao | G06F 17/30536 702/127 |
| 8,145,512 B1* | 3/2012 | Henne | G06Q 10/063 705/7.11 |
| 8,335,757 B2 | 12/2012 | Su et al. | |
| 8,595,176 B2 | 11/2013 | Wang et al. | |
| 2003/0013099 A1 | 1/2003 | Lasek et al. | |
| 2004/0267770 A1* | 12/2004 | Lee | G06F 17/30539 |
| 2006/0074824 A1* | 4/2006 | Li | G06F 17/30539 706/20 |
| 2007/0055665 A1 | 3/2007 | Kitailara et al. | |
| 2007/0203903 A1* | 8/2007 | Attaran Rezaei | G06F 17/30873 |
| 2007/0219992 A1 | 9/2007 | Bollinger et al. | |
| 2010/0251210 A1* | 9/2010 | Amaral | G06F 11/3604 717/105 |
| 2016/0239755 A1* | 8/2016 | Aggour | G05B 23/0229 |
| 2016/0267503 A1* | 9/2016 | Zakai-or | G06Q 10/00 |

OTHER PUBLICATIONS

International Search Report and Written Opinion of the International Searching Authority, dated Apr. 1, 2015, issued in related PCT Application No. PCT/US2014/051408.

Katerina Vrotsou, "Interactive Visual Event-Sequence Mining", Feb. 3, 2014.

Mooney, et al., "Sequential Pattern Mining: Approaches and Algorithms", ACM Computing Surveys, vol. 45, Issue. 2, Feb. 2013, 47 pages.

Pei, et al., "Constraint-based sequential pattern mining: the pattern-growth methods", Journal of Intelligent Information Systems, Springer Science + Business Media, 2006, 28 pages.

Pei, et al., "PrefixSpan: Mining Sequential Patterns Efficiently by Prefix-Projected Pattern Growth", In 17th International Conference on Data Engineering, 2001, pp. 215-226.

Wongsuphasawat, et al., "LifeFlow: Visualizing an Overview of Event Sequences", In Proceedings of the 2011 Annual Conference on Human Factors in Computing Systems (CHI 2011), May 2011, pp. 1747-1756.

Garofalakis, et al., "SPIRIT: Sequential Pattern Mining with Regular Expression Constraints", In Proceedings of the 25th VLDB Conference, 1999, pp. 223-234.

Zaki, "SPADE: An Efficient Algorithm for Mining Frequent Sequences", Machine Learning, vol. 42, Issue 1-2, 2001, pp. 31-60.

Mabroukeh, et al., A Taxonomy of Sequential Pattern Mining Algorithms, ACM computing Surveys, vol. 43, No. 1, Nov. 2010, pp. 3:1-3:41.

Agrawal, et al., "Mining Sequential Patterns", In 11th International Conference on Data Engineering, IEEE Computer Society Press, 1995, pp. 3-14.

Shen, et al., "Visual Analysis of Massive Web Session Data", IEEE Symposium on Large Data Analysis and Visualization (LDAV), Oct. 2012, 9 pages.

* cited by examiner

| Type of constraint | Constraint | Visual specification language | Explanation |
|---|---|---|---|
| Logical | Item/event inclusion | | Include item/event $a_j$ in the next iteration |
| Logical | Item/event exclusion | | Exclude item/event $a_j$ in the next iteration |
| Logical | In-between item/event number more than | | Have more than $n$ items/events between $a$ and $a_k$ |
| Logical | In-between item/event number less than | | Have less than $n$ items/events between $a$ and $a_k$ |
| Logical | In-between item/event number between | | Make the number of items/events between $a$ and $a_k$ greater than $m$ and less then $n$ |
| Temporal | Before | | Put $a_k$ before $a$ |
| Temporal | After | | Put $a_k$ after $a$ |
| Temporal | Duration larger than | | Have more than $x$ sec/min/hr between $a$ and $a_k$ |
| Temporal | Duration less than | | Have less than $x$ sec/min/hr between $a$ and $a_k$ |

FIG. 3

INTERACTIVE SEQUENTIAL PATTERN MINING

BACKGROUND

Sequential pattern mining is an algorithmic method to discover statistically relevant sequence patterns in a sequence database.

BRIEF DESCRIPTION OF THE DRAWINGS

FIG. 3 is a table providing a summary of example constraints, their visual specification languages and explanations.

DETAILED DESCRIPTION

Figure 1:
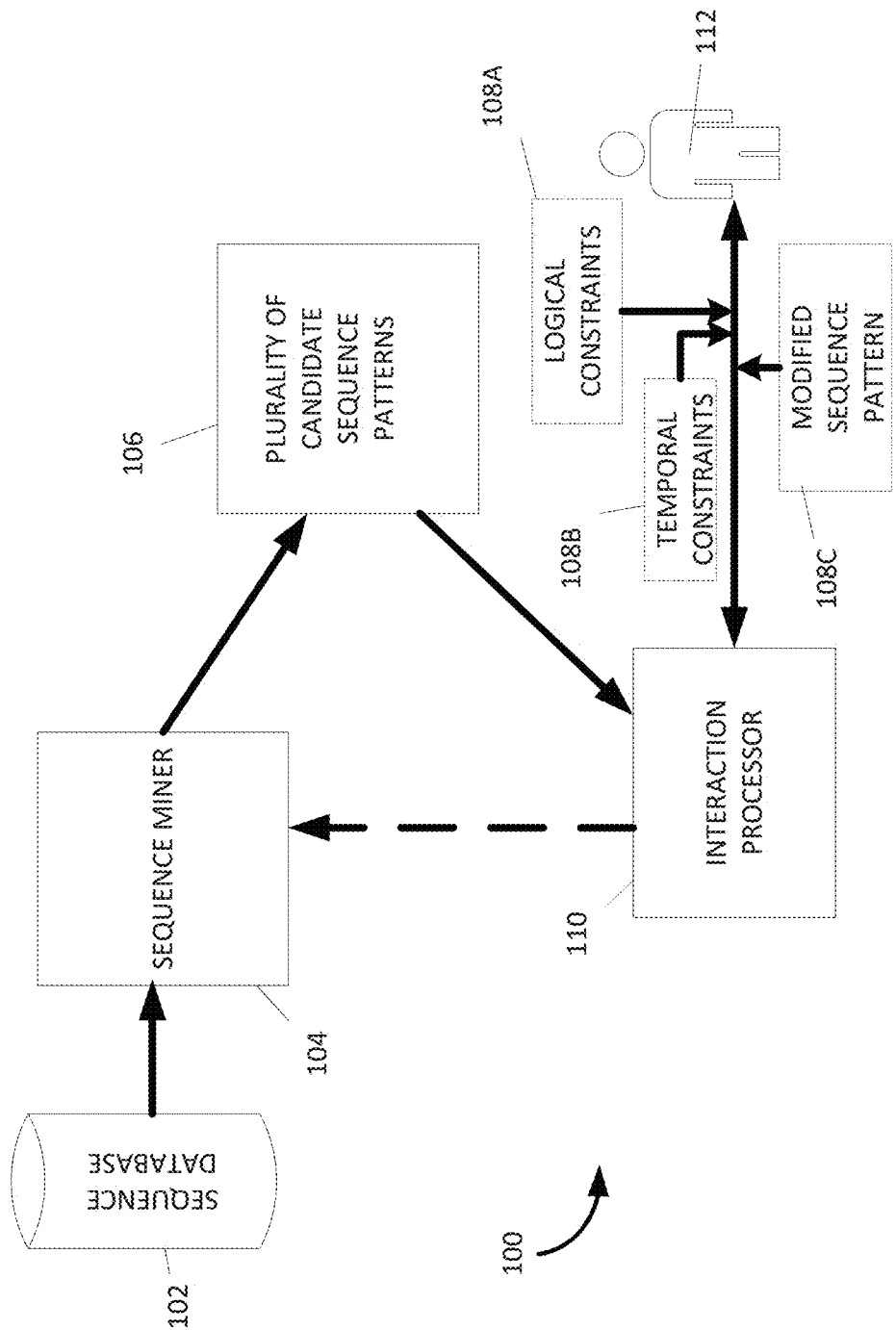
FIG. 1 is a functional block diagram illustrating one example of a system for interactive sequential pattern mining.

A sequence database may be mined to extract statistically relevant information, such as discovering frequently occurring patterns with a minimum frequency greater that a user-defined threshold. Generally, there are two main categories of algorithms: Apriori and pattern growth. Apiori-based approaches are based on an idea that a sequence of k items cannot be frequent unless all of its subsequences are frequent. Accordingly, the algorithm generates candidate sequences of increasing length and checks for a minimum frequency against the database. The problem with this approach is that the number of candidate sequences may rise exponentially in relation to the number of items in the database, and therefore the search space is significant. Such an approach is computationally expensive since every iteration of frequency counting requires database scans. Vertical data structures are known to largely reduce database scans. The pattern growth approach mines frequent sequences without using candidate generation. The algorithm uses the set of frequent single items as a prefix and compresses the database into a tree having a branch for each of the prefixes. This approach improves the efficiency by significantly reducing the number of database scans, but requires a high memory load.

Generally, such sequence mining approaches tend to return a large number of frequent patterns of which a small subset may be interesting to the end user. Many of these patterns are irrelevant or uninteresting since the domain knowledge is not incorporated in the mining process. The problem with most algorithmic data mining approach, such as Apriori and pattern growth, is a lack of user-controlled focus in the pattern mining process. The user input is limited to specifying a minimum threshold, which does not have any semantic meaning, for extracting patterns. Other constraint-based sequential pattern mining algorithms allow integration of user-defined constraints in a formal language such as regular expression. A constraint is a limitation or restriction applied to the data. In one example, the constraint may be context-driven. Such an approach may reduce the search space and make the results more interesting. However, there exist two main problems. The first is that a domain expert may not be trained to specify domain constraints in a formal language like regular expression. The second is the lack of interactivity. The pattern mining process is still a black box to the user. If something were to go wrong or if something unexpected were to take place, the user would need to wait for the mining process to complete, reconfigure the constraints, and rerun the algorithm. Thus interactivity is key to integrate user-defined constraints into every step of the pattern-mining algorithm.

As described in various examples herein, an interactive approach for sequential pattern mining is disclosed that enables dynamic integration of domain knowledge (i.e., through user-defined constraints) into the pattern mining process, thus restricting the search space and computation to those sequences that may be interesting to users such as domain experts. The user may interactively explore and mine interesting patterns from a large number of sequential data, where "interesting" is context-driven and may vary from one user to another. The direction of the mining process depends on the interests of the user, thereby making the process context-driven. This results in an increase in the number of candidate patterns that may be relevant to a particular user.

The interactive approach for sequential pattern mining may generally comprise two interactive steps: identifying and ranking candidate sequence patterns based on their interestingness (the mining step) and exploring candidate patterns and integrating constraints (the interaction step). The mining step narrows down the search space by taking into account user-specified constraints. In one example, a support counting algorithm may be utilized to rank order candidate patterns based on their interestingness. The interaction step allows the user to explore candidate patterns in context and integrate domain knowledge in the form of constraints to guide the mining process. These two steps may be performed iteratively until the mining process is terminated. In one example, the mining process may be terminated by the user when the user discovers at least one sequence pattern of interest. In one example, the mining process may be terminated when the mining process cannot find the sequences that satisfy the constraints specified by the user. These two steps may supplement one another to reach a common goal: find interesting sequence patterns that are useful and interpretable to the user. The identified sequences may not be the most frequent, but they may be the most relevant to the domain expert.

For example, a domain expert such as a grocery store manager may utilize sequence patterns to gain insights into customer data. Such insights may increase business efficiency, ensure customer convenience and/or satisfaction, and/or increase revenues. A sequence may be generated based on a frequency of purchase in customer transactions. For example, at a first iterative step, the following sequences may be generated: Milk (71%); juice (66%); napkins (49%);

egg (45%); beer (41%); beef (36%) . . . pants (4%); sneakers (3%). The store manager may be interested in items that sell well. Accordingly, based on domain expertise, the store manager may set a threshold of 36%, and may modify the sequence to Milk (71%); juice (66%); napkins (49%); egg (45%); beer (41%); beef (36%).

As described in various examples herein, interactive sequential pattern mining is disclosed. One example is a system including a sequence miner, and an interaction processor. A sequence database is received, the sequence database including a plurality of input sequences, where each sequence of the plurality of input sequences is an ordered list of events, and each event in the list of events includes at least one item. The sequence miner mines the sequence database for a plurality of candidate sequence patterns, the mining based on an interaction with a user. The interaction processor processes the interaction with the user, the interaction based on domain relevance of the plurality of candidate sequence patterns to the user.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for system for interactive sequential pattern mining. The system 100 receives a sequence database including a plurality of input sequences, where each sequence of the plurality of input sequences is an ordered list of events, and each event in the list of events includes at least one item. The system 100 mines the sequence database for a plurality of candidate sequence patterns, the mining being based on an interaction with a user. The system 100 processes the interaction with the user, the interaction based on domain relevance of the plurality of candidate sequence patterns to the user. In one example, an interactive visual representation of the plurality of candidate sequence patterns is provided to the user.

System 100 includes a sequence database 102 with a plurality of input sequences, a sequence miner 104, a plurality of candidate sequence patterns 106 generated by system 100, an interaction processor 110, and a user 112. In one example, the sequence database 102 may include a plurality of input sequences, where each sequence of the plurality of input sequences is an ordered list of events, and each event in the list of events includes at least one item. In one example, the sequence database 102 may be a database of customer transactions, Web navigation logs (e.g. click stream), security logs, and/or DNA sequences. In one example, sequence database 102, denoted D, consists of the plurality of input sequences, where a given sequence of the plurality of input sequences may be associated with at least one of a sequence identifier identifying the given sequence, an event identifier identifying a given event in the ordered list of events associated with the given sequence, an event time identifier identifying a time when the given event occurred, and an item identifier associated with the at least one item in the given event. In one example, multiple item identifiers may be respectively associated with multiple items in the given event.

Let $I=\{i_1, i_2, \ldots, i_m\}$ be a set of items. An event $e=\{i_1, i_2, \ldots, i_k\}$ is a nonempty unordered collection of items which may be accessed at the same time, where $i_j$ is an item. A sequence is an ordered list of events. A sequence α may be represented as $<\alpha_1 \rightarrow \alpha_2 \rightarrow \ldots \rightarrow \alpha_m>$, where $\alpha_j$ is an event. Although an item may occur once in an event, an item may occur several times in different events of a sequence. Generally, there may be two types of sequence data: an event including multiple items and an event including a single item. For example, in a customer transaction database, each transaction (i.e., event) may have multiple purchased items (i.e., item). On the other hand, in Web access logs, each click (i.e., event) contains one URL of a clicked web page (i.e., item).

A k-sequence is a sequence with k-items, where $k=\Sigma_j |\alpha_j|$. A sequence $\alpha=<\alpha_1 \rightarrow \alpha_2 \rightarrow \ldots \rightarrow \alpha_m>$ is a subsequence of another sequence $\beta=<\beta_1 \rightarrow \beta_2 \rightarrow \ldots \rightarrow \beta_n>$, and denoted α ≼ β, if there are integers $i_1 < i_2 < \ldots < i_l$, such that $\alpha_1 \subseteq \beta_{i_1}$, $\alpha_2 \subseteq \beta_{i_2}, \ldots \alpha_l \subseteq \beta_{i_l}$. For example, the sequence $<B \rightarrow AC>$ is a subsequence of $<AB \rightarrow E \rightarrow AC>$, since $B \subseteq AB$ and $AC \subseteq ACD$, and the order of events is preserved. On the other hand, $<AB \rightarrow E>$ is not a subsequence of $<ABE>$ and vice versa.

Table 1 illustrates an example of raw input data, such as a customer transaction database. Each transaction may be considered as an event, where a transaction identifier is equivalent to the event identifier, and transaction time is equivalent to the event time. The numbers in the "items bought" section represent product identifiers associated with products purchased in the respective transactions. Details of the items are omitted, such as product name, product brand, discount, and so forth. The transaction identifier may be automatically generated following a specific pattern (e.g., increasing integers based on transaction time in Table 1).

TABLE 1

Customer Transaction Database

| Customer Identifier | Transaction Identifier | Transaction time | Items bought |
|---|---|---|---|
| 1 | 6 | 2003-06-25T13:15:30Z | 30 |
| 1 | 9 | 2003-06-30T18:03:03Z | 90 |
| 2 | 1 | 2003-06-10T09:20:10Z | 10, 20 |
| 2 | 3 | 2003-06-15T20:08:09Z | 30 |
| 2 | 4 | 2003-06-20T21:15:37Z | 40, 60, 70 |
| 3 | 5 | 2003-06-25T11:10:33Z | 30, 50, 70 |
| 4 | 7 | 2003-06-25T16:35:20Z | 30 |
| 4 | 8 | 2003-06-30T17:18:52Z | 40, 70 |
| 4 | 10 | 2003-07-25T16:52:44Z | 90 |
| 5 | 2 | 2003-06-12T10:12:07Z | 90 |

In one example, raw input data is received via the processing system, and a data converter (not illustrated in FIG. 1) may generate the sequence database from the raw input data. For example, the raw input data in a database (as illustrated in Table 1) may be converted by the data converter into a sequence database (as illustrated in Table 2) for sequential pattern mining. For example, Customer Identifier "1" in Table 1 may be associated with Sequence Identifier "1" in Table 2. Transaction Identifiers "6" and "9" corresponding to Customer Identifier "1" in Table 1 are associated with one item each, i.e. "30" and "90" respectively. Accordingly, in Table 2, the event identifier for sequence identifier "1" is associated with the sequence 6→9, and the items present are illustrated as (30)→(90). On the other hand, transaction identifier "1" corresponding to customer identifier "2" in Table 1 is associated with two items "10" and "20"; transaction identifier "3" corresponding to customer identifier "2" in Table 1 is associated with one item "30"; and transaction identifier "4" corresponding to customer identifier "2" in Table 1 is associated with three items "40", "60", and "70". Accordingly, in Table 2, the event identifier for sequence identifier "2" is associated with the sequence 1→3→4, and the items present are illustrated as (10, 20)→(30)→(40, 60, 70).

TABLE 2

Sequence database of Table 1

| Sequence Identifier | Event time | Event id | Items present |
|---|---|---|---|
| 1 | (2003-06-25T13:15:30Z) → (2003-06-30T18:03:03Z) | 6 → 9 | (30) → (90) |
| 2 | (2003-06-10T09:20:10Z) → (2003-06-15T20:08:09Z) →(2003-06-20T21:15:37Z) | 1 → 3 → 4 | (10, 20) → (30) → (40, 60, 70) |
| 3 | (2003-06-25T11:10:33Z) | 5 | (30, 50, 70) |
| 4 | (2003-06-25T16:35:20Z) → (2003-06-30T17:18:52Z) →(2003-07-25T16:52:44Z) | 7 → 8 → 10 | (30) → (40, 70) → (90) |
| 5 | (2003-06-12T10:12:07Z) | 2 | (90) |

Sequence miner 104 mines the sequence database for a plurality of candidate sequence patterns, the mining based on an interaction with a user 112. The sequence miner 104 finds candidate subsequences according to their interestingness (e.g. frequency) taking into consideration user-specified constraints. This algorithm may have two input parameters: current sequence α (assume the number of items included in α is k) and constraint set $\mathcal{C}$. In one example, the two parameters may be optional. For example, in a first iteration, a set of candidate sequences may be provided without input from user 112. Thus, in the first iteration, the algorithm may mine all possible 1-sequences. This applies to successive iterations as well, if the user 112 does not specify any constraints.

In one example, system 100 includes a ranker (not illustrated in FIG. 1). The ranker ranks the plurality of candidate sequence patterns, the ranking based on a frequency of occurrence of a sequence pattern in the plurality of sequence patterns. The support or frequency of a sequence α, denoted as σ(α, D), is defined as the number of input sequences in a sequence database D that contain α. In one example, the ranker ranks the candidate subsequences according to their support taking into consideration constraints specified by user 112.

In one example, interaction processor 110 processes the interaction with the user 112 to provide at least one sequence pattern, the interaction being based on domain relevance of the plurality of candidate sequence patterns to the user. A domain is an environment associated with the sequence database 102, and domain relevance is semantic and/or contextual knowledge relevant to aspects of the domain. For example, the sequence database 102 may be a database of customer transactions, and the domain may be a physical store where the customer transactions take place, and domain relevance may be items purchased at the physical store and the customer shopping behavior. As another example, the sequence database 102 may be a database of Web navigation logs (e.g. click stream), and the domain may be the domain name servers that are visited via the navigation logs, and domain relevance may be analysis of Internet traffic. Also, for example, the sequence database 102 may be a database of security logs, and the domain may be a secure office space for which the security logs are being maintained and/or managed, and domain relevance may be tracking security logs based on preferences such as location, time, frequency, error logs, warnings, and so forth. As another example, the sequence database 102 may be a database of DNA sequences, and the domain may be a healthcare facility that is collecting and/or managing patient healthcare data, and domain relevance may be a group of patients, a type of disease, a segment of the DNA, and so forth.

Generally, the user may be an individual who is a domain expert. For example, the domain may be a retail store, and the user may be the store manager. Also, for example, the domain may be a hospital, and the user may be a member of the hospital management staff. As another example, the domain may be a casino, and the user may be the casino manager. The interaction processor 110 processes the interaction with the user 112 to help the user 112 explore interesting patterns and incorporate domain knowledge in the form of constraints into the next iteration of the mining process. For example, the domain may be a retail store, and the domain knowledge may include knowledge about traffic patterns in the store, customer purchases, product placement, products sold, available inventory, clientele, store hours, and so forth. In one example, the interaction processor provides, to the user, an interactive visual representation of the plurality of candidate sequence patterns. For example, to enable the domain expert to better understand and discover patterns, interaction processor 110 may provide a context-augmented interface for visually guided exploration.

Figure 2:
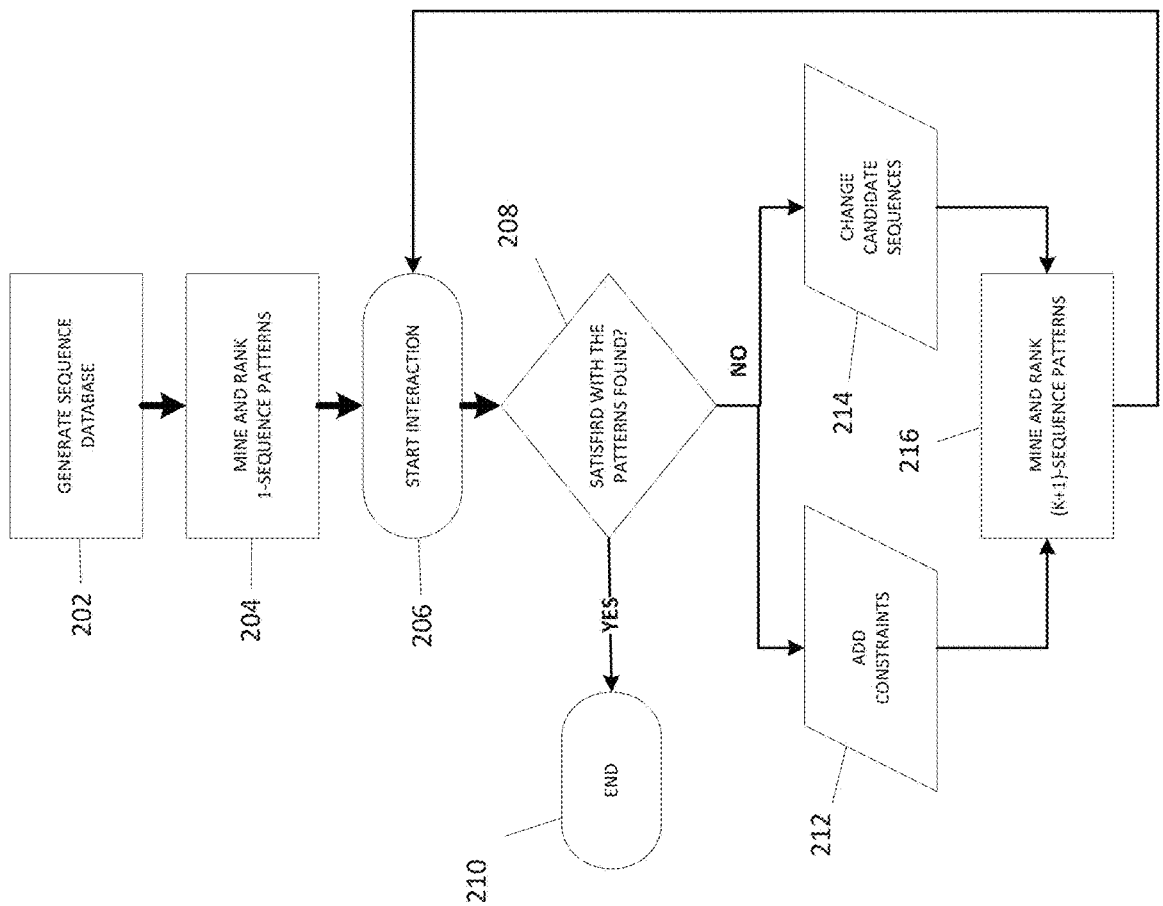
FIG. 2 is a flow diagram illustrating one example of interaction in a method for interactive sequential pattern mining.

FIG. 2 is a flow diagram illustrating one example of an interaction in a method for interactive sequential pattern mining. Some aspects of FIG. 2 may be described with reference to the system 100 described in FIG. 1. For example, a domain expert such as a grocery store manager may utilize sequence patterns to gain domain relevant insights into customer data. At 202, a sequence database is generated, for example, based on a frequency of purchase. At 204, sequence miner 104 may mine 1-sequence patterns, and the ranker may rank the 1-sequence patterns. For example, at a first iterative step, the following sequence may be generated: Milk (71%); juice (66%); napkins (49%); egg (45%); beer (41%); beef (36%) . . . pants (4%); sneakers (3%). At 206, interaction processor 110 may start interaction with the grocery store manager. For example, the store manager may be interested in items that sell well. Accordingly, based on domain relevance, the store manager may set a threshold of 36%, and may modify the sequence to Milk (71%); juice (66%); napkins (49%); egg (45%); beer (41%); beef (36%), At 208, in one example, the interaction processor 110 receives, from the user 112, a first indication that the user 112 is satisfied with at least one sequence pattern of the plurality of candidate sequence patterns. Accordingly, at 210, the process ends. In one example, the at least one sequence pattern may be provided to the user 112, In one example, at 208, the interaction processor 110 receives, from the user 112, a second indication that the user 112 is not satisfied with any sequence pattern of the plurality of candidate sequence patterns, In one example, the process ends based on a lack of sequence patterns relevant to the user. In one example, at 212, the interaction processor 110 receives, from the user 112, a constraint to guide the sequence miner 104. For example, the interaction processor 110 may provide the constraint to the sequence miner 104.

In one example, the constraint may be at least one of a logical constraint 108A and a temporal constraint 108B, as illustrated in FIG. 1 and described herein.

Referring again to FIG. 1, the logical constraints 108A specify the logical relationships between the current sequence a and the candidate event $\alpha_k$ (i.e., placeholder for the candidate event). Logical constraints 108A may include, for example, inclusion, exclusion, and the number of in-between events/items. The temporal constraints 108B relate to the temporal aspects of the events in the sequence, such as before, after, duration, within, etc.

FIG. 3 is a table providing a summary of example constraints, their visual specification languages and explanations. As illustrated in FIG. 3, a logical constraint may be, for example, an item and/or event inclusion. For example, the user may be interested in customer purchase data that includes purchasing beer and milk. Accordingly, for a successive iteration, the user may add an item such as beer to an item such as milk. Also, as illustrated, the logical constraint may be an item and/or event exclusion. For example, at a next iteration, the user may choose to exclude sequences that include a purchase of beer. The logical constraint may also specify that two items be separated by more than a predetermined number of items and/or events. For example, the user may specify that milk and beer be purchased with two or more items between them. For example, milk→bread→eggs→beer may be a desired sequence pattern, but milk→bread→beer may not be a desired sequence pattern. Likewise, the logical constraint may also specify that two items be separated by less than a predetermined number of items and/or events. For example, the user may specify that that milk and beer be purchased with at most two items between them. Accordingly, milk→bread→beer and milk→bread→eggs→beer may be desired sequence patterns, however, milk→bread→eggs→cheese→beer may not be a desired sequence pattern. The logical constraint may also be specified as being two items that should be separated by less than a first predetermined number of items and/or events, but also be separated by more than a second predetermined number of items and/or events.

The temporal constraints may include constraints such as "before", "after", "duration larger than", and/or "duration less than". For example the store manager may be interested in sequences where beer is purchased after milk, or cheese is purchased before eggs. Also, for example, the store manager may be interested in items that are purchased within 24 hours. For example, a customer may have forgotten to pick up an item, and may return within 24 hours to purchase the previously forgotten item. Accordingly, the store manager may request sequences with two items with a temporal constraint 108B (e.g. items that are purchased within 24 hours). The interaction processor 110 may provide the constraint to the sequence miner 104.

Referring again to FIG. 2, at 216, the sequence miner 104 may mine (k+1)-sequence patterns, where k is an integer. In one example, the ranker may rank the (k+1)-sequence patterns. For example, at 216, the sequence miner 104 may mine 2-sequence patterns, and the ranker may rank the 2-sequence patterns. For example, 2-sequence patterns may be generated, such as: Milk, egg (39%); milk, napkin (36%); juice, napkin (35%); juice→napkin (33%); beer→napkin (31%) . . . milk→egg (15%) . . . . The interaction processor 110 may process, at 206, the interaction with the user 112, the interaction based, for example, on the ranking of the 2-sequence patterns. In one example, at 206, the store manager may examine the candidate patterns in the 2-sequence and specify logical and/or temporal constraints to the candidate sequence patterns to guide the mining process. In one example, the store manager may utilize domain knowledge to know that since milk and eggs are placed together in the store, it is unlikely that customers will forget one or the other. Accordingly, the store manager may utilize domain relevance to remove patterns that include both milk and egg, thereby introducing a logical constraint 108A. Additionally, the store manager may not be interested in items that are purchased in the same transaction, so a temporal constraint 108B may be added that the subsequent event must occur after 30 seconds.

In general, the process may repeat itself iteratively as long as user 112 is not satisfied with the sequence patterns generated. In one example, the process may terminate when the user 112 does not find any sequence patterns of interest. In one example, a series of iterative interactions may be processed by the interaction processor 110. For example, at a third iteration, at 216, the following 3-sequence patterns may be generated: Juice→napkin, spoon (31%); Juice, chip-→napkin (30%); beer, chicken→napkin (25%) . . . egg, juice→diaper (1%). At 206, the store manager may examine the candidate patterns in the 3-sequence. For example, the store manager may use domain knowledge to select candidate sequences with a frequency larger than 25%. Accordingly, at 208, the interaction processor 110 may receive, from the user 112, a first indication that the user 112 is satisfied with the 3-sequence patterns, and the following sequences may be selected: Juice→napkin, spoon (31%); Juice, chip→napkin (30%); beer, chicken→napkin (25%). The process ends at 210. Based at least in part on such information the store manager may realize, for example, that people generally forget to purchase napkins after purchasing drinks, and so napkins may be placed closer to juice and beer.

In one example, at 212, the interaction processor 110 receives, from the user 112, at least one modified sequence pattern 108C from the plurality of candidate sequence patterns. In one example, at 214, the user 112 may modify the candidate sequences. For example, instead of the 2-sequence beer→diaper, the store manager may change the 2-sequence to diaper→beer. Also, for example, the store manager may, at 212, add a constraint where a diaper is purchased within one day of a beer purchase.

In one example, the user 112 may add a constraint without modifying a candidate sequence. In one example, the user 112 may modify the candidate sequence but not add a constraint. In one example, the user 112 may modify the candidate sequence and add a constraint.

Figure 4:
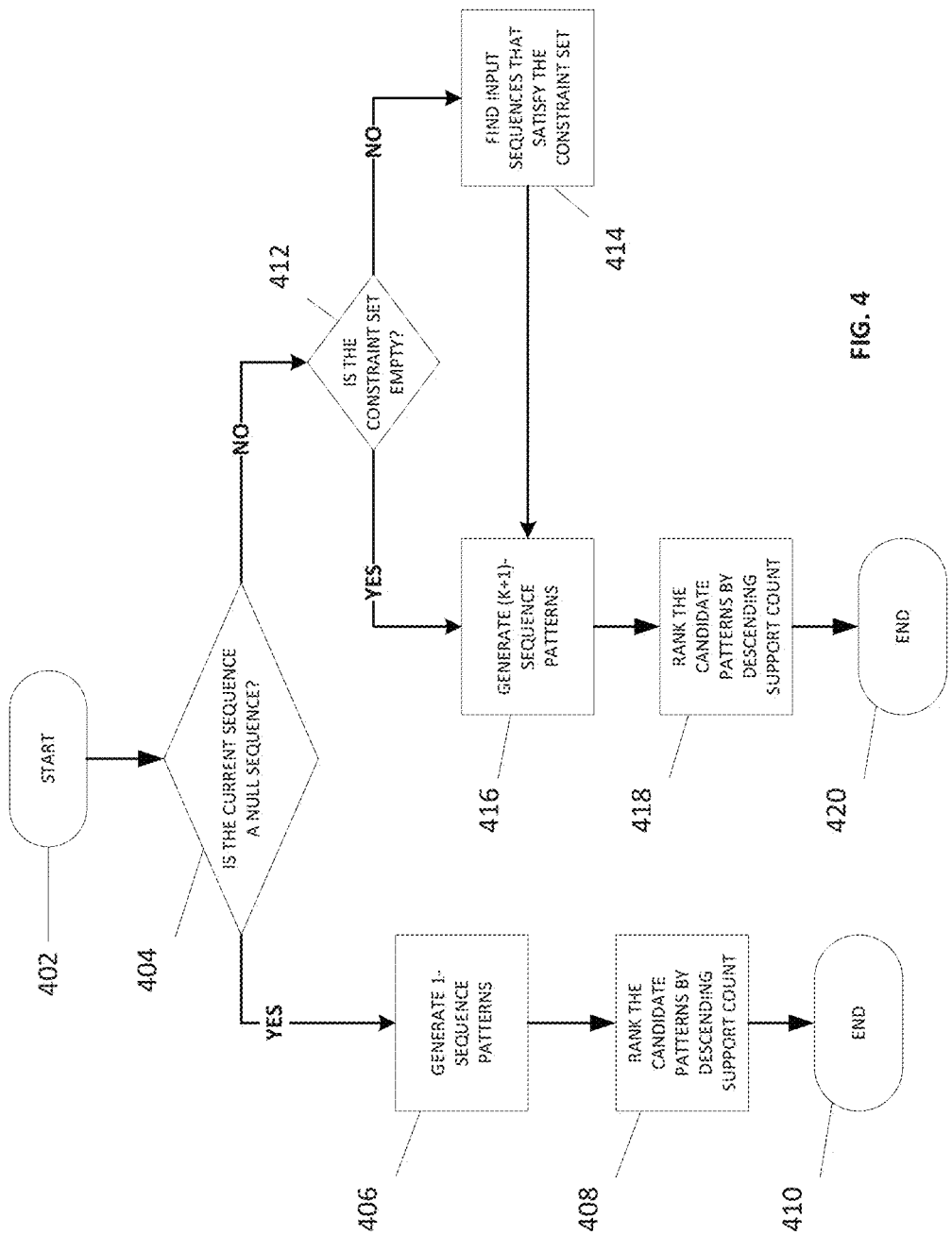
FIG. 4 is a flow diagram illustrating one example of mining in a method for interactive sequential pattern mining.

FIG. 4 is a flow diagram illustrating one example of mining in a method for interactive sequential pattern mining. Some aspects of FIG. 4 may be described with reference to the system 100 described in FIG. 1. The process starts at 402. At 404, the sequence miner 104 may determine if a current set of candidate sequence patterns is a null set. If it is determined that the current set of candidate sequence patterns is a null set, at step 406, the sequence miner 104 generates 1-sequence patterns. In one example, the ranker may rank the 1-sequence patterns. In one example, the 1-sequence patterns may be ranked by descending support count (at 408). At 410, the mining and/or ranking process ends, and the interactive process begins, as for example at 206 with reference to FIG. 2.

If it is determined that the current set of candidate sequence patterns is not a null set, at step 412, the sequence miner 104 determines if the constraint set is an empty set. For example, the user 112 may not provide any constraints. If it is determined that the constraint set is an empty set, at 416, the sequence miner 104 generates (k+1)-sequence patterns. In one example, the ranker may rank the (k+1)-sequence patterns. In one example, the (k+1)-sequence patterns may be ranked by descending support count. At 420, the mining and/or ranking process ends, and the interactive process begins, as for example at 206 (with reference to FIG. 2).

If it is determined that the constraint set is not an empty set, at 414, the sequence miner 104 finds input sequences that satisfy each constraint in the non-empty constraint set. At 416, the sequence miner 104 generates (k+1)-sequence patterns based on the input sequences that satisfy each constraint in the non-empty constraint set. In one example, the ranker may rank the (k+1)-sequence patterns (at 418). At 420, the mining and/or ranking process ends, and the interactive process begins, as for example at 206 (with reference to FIG. 2).

In one example, the interaction processor 110 provides, to the user 112, an interactive visual representation of the plurality of candidate sequence patterns. For example, the (k+1)-sequence patterns may be color-coded and presented to the user 112 by the interaction processor 110. The user (e.g. domain expert) may only examine the visual representations that are easily understandable and intuitive. In one example, such visual constraints may be automatically converted by the interaction processor 110 into database queries that may limit the search space. The specified sequence patterns may represent a category of subsequences that are interesting to the user. Accordingly, the user may control the number of iterations and the size of the search space.

Figure 5A:
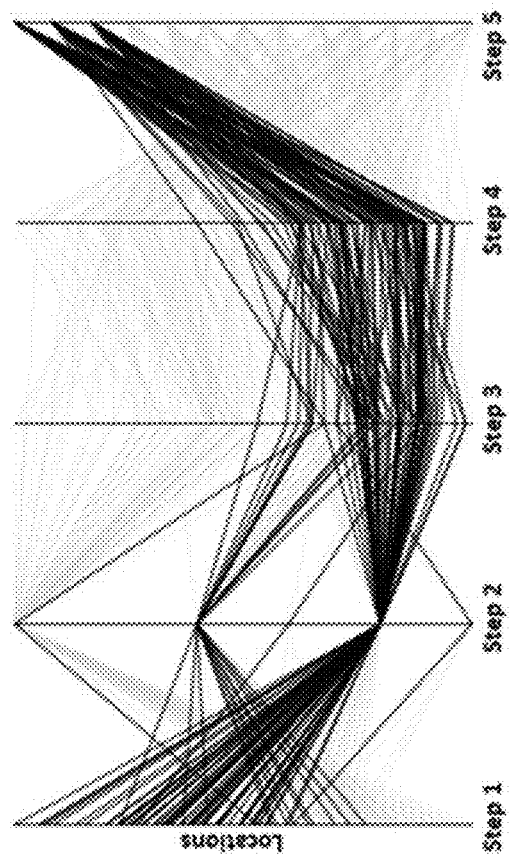
FIG. 5A is a parallel coordinate visualization illustrating one example of a partial customer path in a retail establishment.

FIG. 5A is a parallel coordinate visualization illustrating one example of a partial customer path in a retail establishment. The example partial customer path is illustrated with five steps—Step 1, Step 2, Step 3, Step 4, and Step 5. The vertical lines represent locations in a store, such as different blocks in a store layout view. Customer paths may show similar patterns that indicate similar shopping behaviors. The candidate sequence patterns (or partial paths) are highlighted in black while all the other input sequences are marked in grey.

Figure 5B:
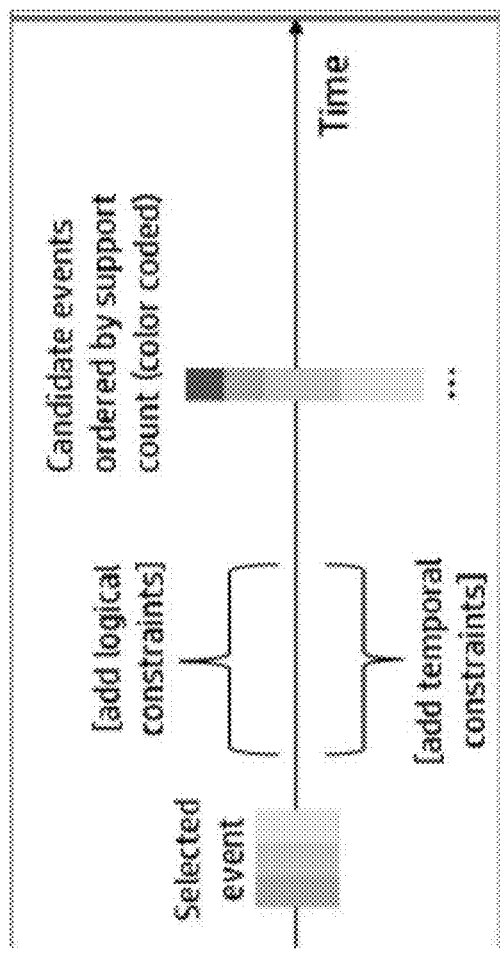
FIG. 5B is an example visualization of constraint insertion.

FIG. 5B is an example visualization of constraint insertion. The horizontal line represents a passage of time. In one example, for a selected event, the domain expert adds constraints. In one example the constraints may be logical constraints 108A and/or temporal constraints 108B. Sequence miner mines the plurality of input sequences to provide candidate sequences, and in one example, the ranker ranks them by support count.

Figure 6:
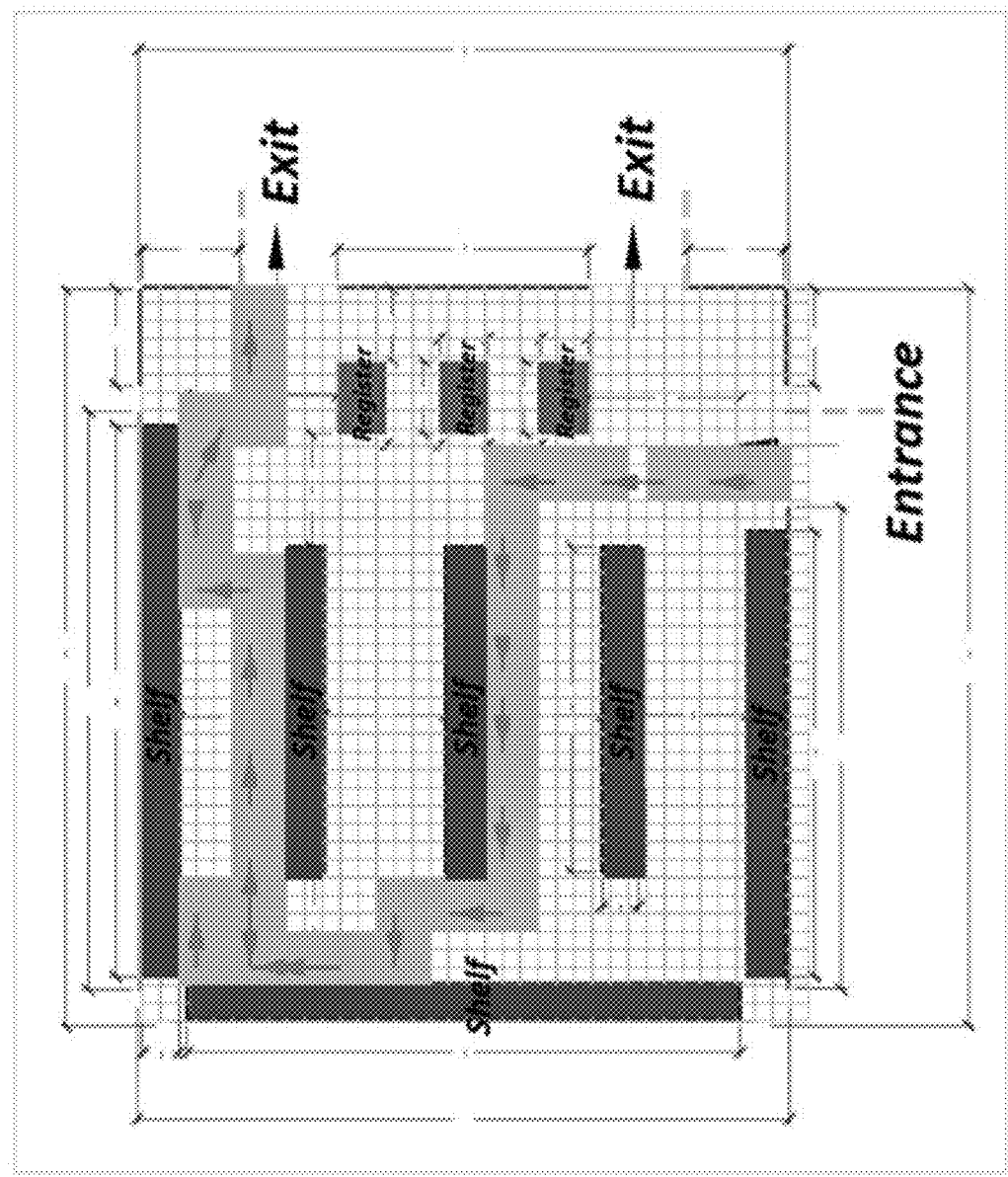
FIG. 6 is an example illustration of a layout in a retail establishment.

FIG. 6 is an example illustration of a layout in a retail establishment. Six example rectangular shelves are arranged, along with three example cash registers to process customer transactions. The entrance and exit are both marked on the layout. An example customer path is illustrated with arrows. Such a customer path may represent a sequence candidate that a domain expert may be interested in. This auxiliary figure gives an idea of the semantic meaning of the selected sequences and help with the sequence exploration process. This visualization is highly domain dependent. For other applications, different visualizations may be needed to reflect the semantic and/or contextual meanings of a sequence database.

Figure 7:
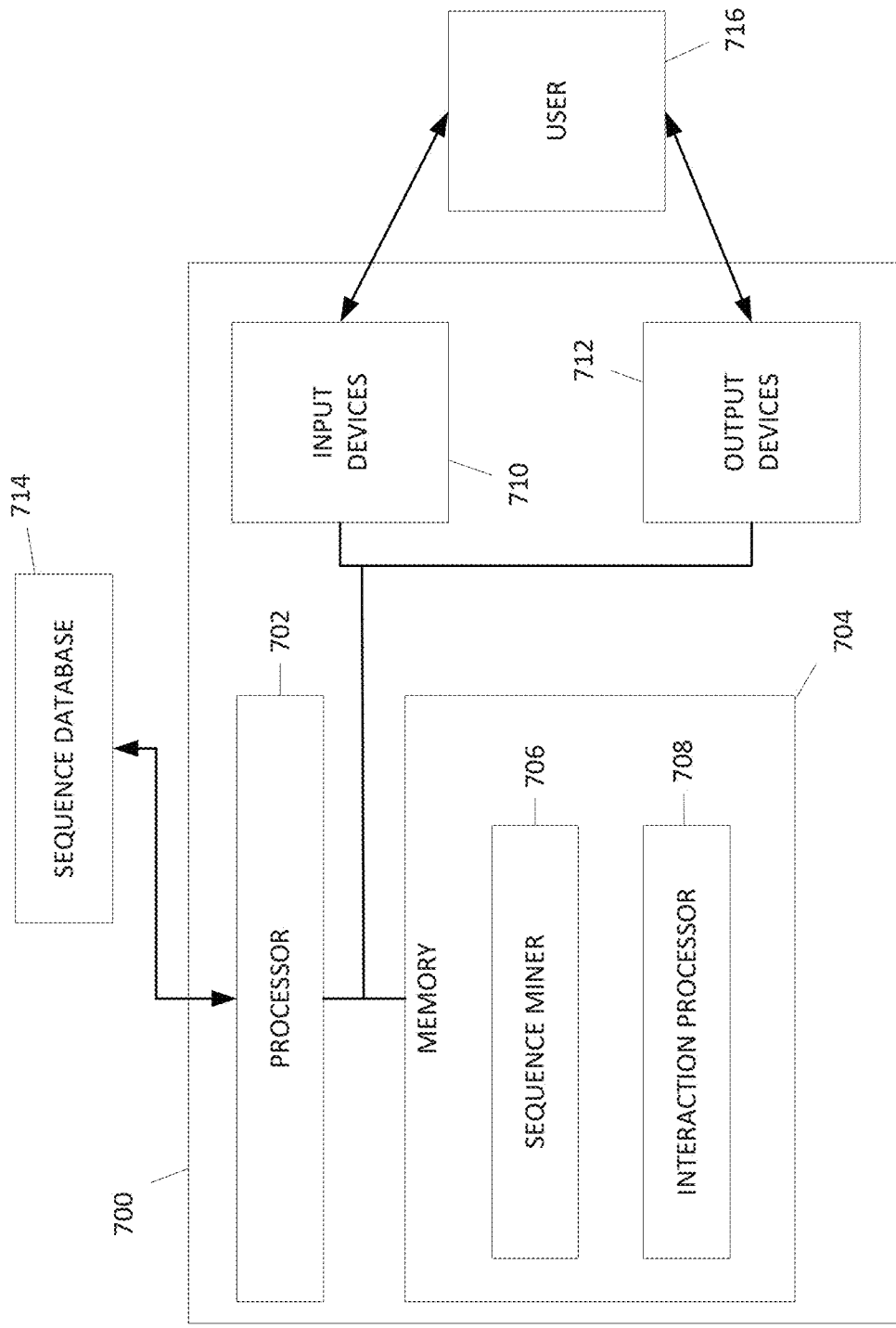
FIG. 7 is a block diagram illustrating one example of a processing system for implementing the system for interactive sequential pattern mining.

FIG. 7 is a block diagram illustrating one example of a processing system 700 for implementing the system 100 for interactive sequential pattern mining. Processing system 700 includes a processor 702, a memory 704, input devices 710, and output devices 712. A user 716 may communicate interactively with the processing system 700 via the input devices 710 and output devices 712. A sequence database 714 may be stored on an external storage disk that may be interactively linked to the processing system 700 via the processor 702. In one example, the sequence database 714 may be stored in the memory 704. Processor 702, memory 704, input devices 710, and output devices 712 are coupled to each other through communication link (e.g., a bus).

Processor 702 includes a Central Processing Unit (CPU) or another suitable processor. In one example, memory 704 stores machine readable instructions executed by processor 702 for operating processing system 700. Memory 704 includes any suitable combination of volatile and/or non-volatile memory, such as combinations of Random Access Memory (RAM), Read-Only Memory (ROM), flash memory, and/or other suitable memory.

The sequence database 714 may include a plurality of input sequences, where each sequence of the plurality of input sequences is an ordered list of events, and each event in the list of events includes at least one item. Typically, there may be two types of sequence data: an event containing multiple items and an event containing only one item. For example, in a customer transaction database, each transaction (i.e., an event) has multiple purchased items (i.e., item). While in Web access logs, each click (i.e., event) contains one URL of a clicked web page (i.e., item). In one example, raw input data may be received via the processing system 700, and a data converter may generate the sequence database 714 from the raw input data.

Memory 704 also stores instructions to be executed by processor 702 including instructions for a sequence miner 706, and an interaction processor 708. In one example, sequence miner 706, sequence database 714, user 716, and interaction processor 708, include sequence miner 104, sequence database 102, user 112, and interaction processor 110, respectively, as previously described and illustrated with reference to FIG. 1.

Processor 702 executes instructions of sequence miner 706 to mine the sequence database 714 for a plurality of candidate sequence patterns, the mining based on an interaction with user 716. In one example, processor 702 executes instructions of ranker (not illustrated in FIG. 7) to rank the plurality of candidate sequence patterns, the ranking based on a frequency of occurrence of a sequence pattern in the plurality of input sequences. The ranked plurality of candidate sequence patterns may be provided to the interaction processor 708 for the interaction with the user 716.

Processor 702 executes instructions of an interaction processor 708 to process the interaction with the user 716 to provide at least one sequence pattern, the interaction based on domain relevance of the plurality of candidate sequence patterns to the user 716. As described herein, the interaction processor 708 allows user 716 to add logical and/or temporal constraints to the candidate sequence patterns to guide the sequence miner 706. In one example, processor 702 executes instructions of an interaction processor 708 to provide, to the user 716, an interactive visual representation of the plurality of candidate sequence patterns. In one example, processor 702 executes instructions of an interaction processor 708 to receive, from the user 716, a first indication that the user 716 is satisfied with at least one sequence pattern of the plurality of candidate sequence patterns.

In one example, processor 702 executes instructions of an interaction processor 708 to receive, from the user 716, a second indication that the user 716 is not satisfied with any sequence pattern of the plurality of candidate sequence patterns. In one example, processor 702 executes instructions of an interaction processor 708 to receive, from the user 716, a constraint to guide the sequence miner 706 to mine the sequence database 714.

In one example, processor 702 executes instructions of an interaction processor 708 to receive, from the user, at least one modified sequence pattern from the plurality of candidate sequence patterns. Processor 702 executes instructions of sequence miner 706 to mine the sequence database 714 based on the at least one modified sequence pattern.

Input devices 710 include a keyboard, mouse, data ports, and/or other suitable devices for inputting information into processing system 200. In one example, input devices 710 are used to by the interaction processor 708 to interact with the user. Output devices 712 include a monitor, speakers, data ports, and/or other suitable devices for outputting information from processing system 700. In one example, output devices 712 are used to provide an interactive visual representation of the plurality of candidate sequence patterns.

Figure 8:
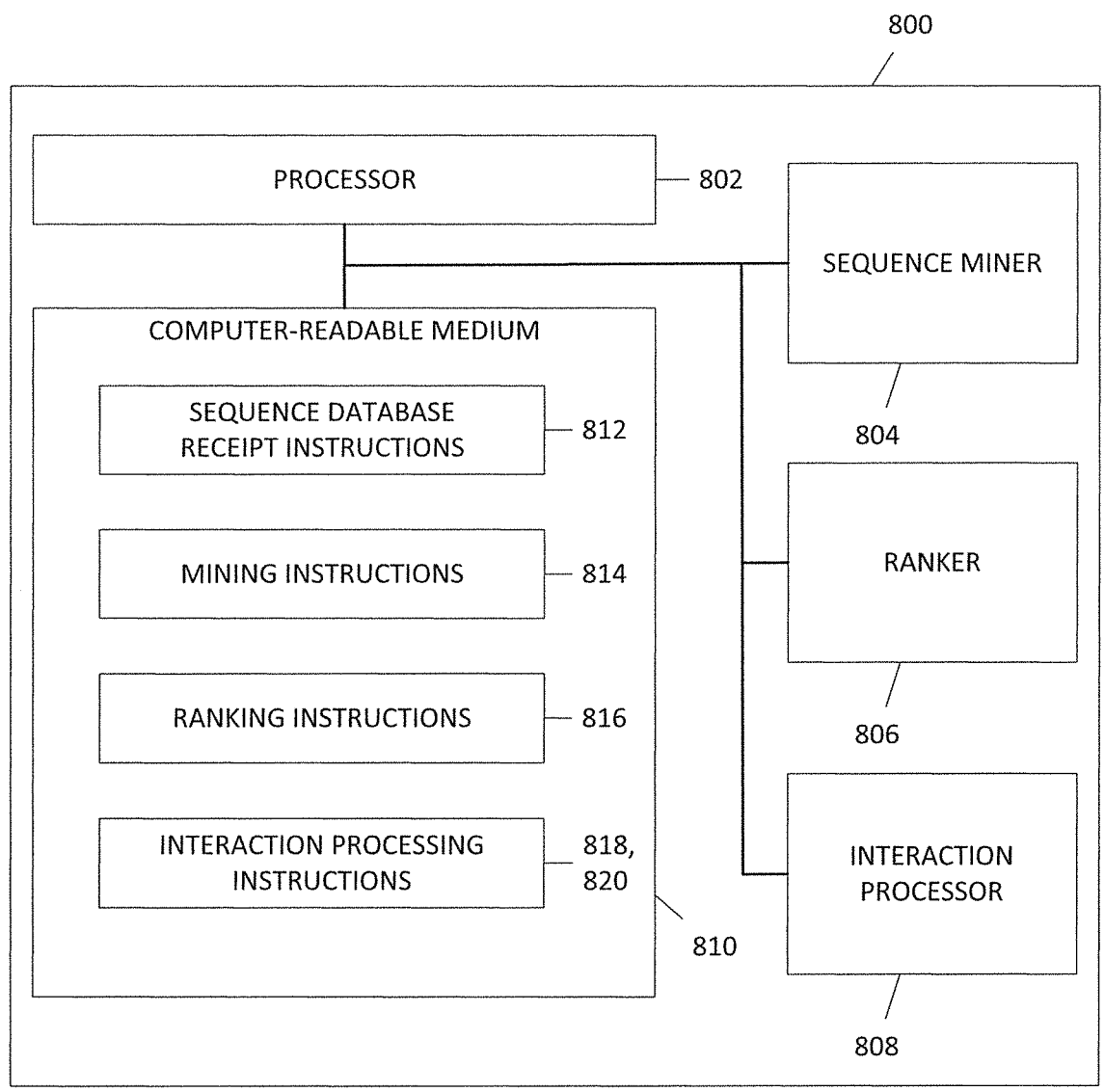
FIG. 8 is a block diagram illustrating one example of a computer readable medium for interactive sequential pattern mining.

FIG. 8 is a block diagram illustrating one example of a computer readable medium for interactive sequential pattern mining. Processing system 800 includes a processor 802, a computer readable medium 810, a sequence miner 804, a ranker 806, and an interaction processor 808. Processor 802, computer readable medium 810, sequence miner 804, ranker 806, and interaction processor 808 are coupled to each other through communication link (e.g., a bus).

Processor 802 executes instructions included in the computer readable medium 810. Computer readable medium 810 includes sequence database receipt instructions 812 to receive a sequence database. The sequence database receipt instructions 812 include instructions to receive a plurality of input sequences, wherein each sequence of the plurality of input sequences is an ordered list of events, and each event in the list of events includes at least one item. In one example, sequence database receipt instructions 812 include instructions to receive at least one of a sequence identifier identifying the given sequence, an event identifier identifying a given event in the ordered list of events associated with the given sequence, an event time identifier identifying a time when the given event occurred, and an item identifier associated with the at least one item in the given event. In one example, multiple item identifiers may be respectively associated with multiple items in the given event.

Computer readable medium 810 includes mining instructions 814 of a sequence miner 804 to mine the sequence database for a plurality of candidate sequence patterns, the instructions to mine being based on an interaction with a user. Computer readable medium 810 includes ranking instructions 816 of a ranker 806 to rank the plurality of candidate sequence patterns, the ranking based on a frequency of occurrence of a sequence pattern in the plurality of input sequences.

Computer readable medium 810 includes interaction processing instructions 818 to process the interaction with the user, the interaction being based on an interactive visual representation of the ranked plurality of candidate sequence patterns, and the interaction further based on domain relevance of the plurality of candidate sequence patterns to the user. In one example, computer readable medium 810 includes interaction processing instructions 818 to receive, from the user, a first indication that the user is satisfied with at least one sequence pattern based on the visual representation. In one example, computer readable medium 818 includes interaction processing instructions 820 to receive, from the user, a second indication that the user is not satisfied with any sequence pattern of the plurality of candidate sequence patterns based on the visual representation. In one example, computer readable medium 810 includes interaction processing instructions 818 to receive, from the user, a constraint, and further includes mining instructions 814 to mine the sequence database based on the constraint.

Figure 9:
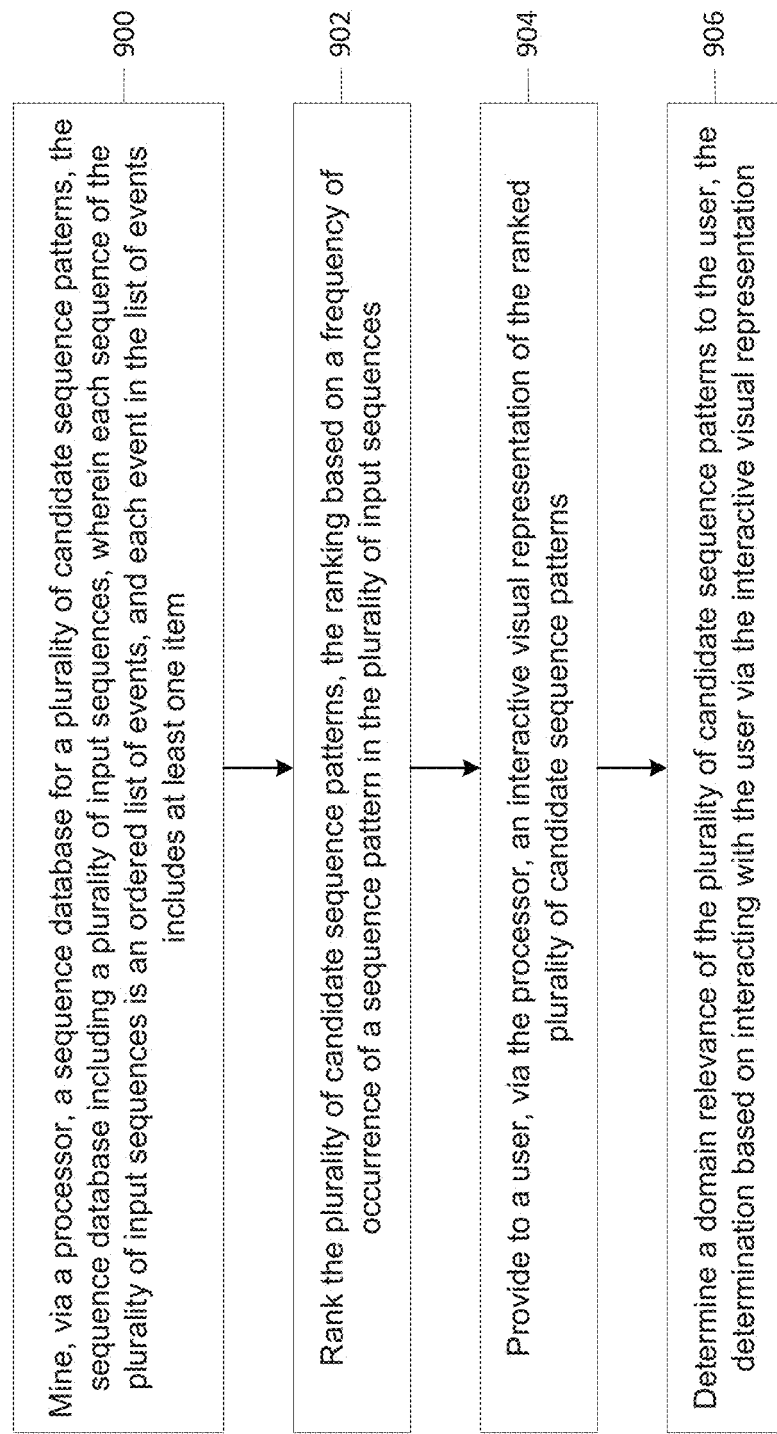
FIG. 9 is a flow diagram illustrating one example of a method for interactive sequential pattern mining.

FIG. 9 is a flow diagram illustrating one example of a method for interactive sequential pattern mining. At 900, a sequence database is mined via a processor for a plurality of candidate sequence patterns, the sequence database including a plurality of input sequences, wherein each sequence of the plurality of input sequences is an ordered list of events, and each event in the list of events includes at least one item. At 902, the plurality of candidate sequence patterns are ranked, the ranking based on a frequency of occurrence of a sequence pattern in the plurality of input sequences. At 904, an interactive visual representation of the ranked plurality of candidate sequence patterns is provided to a user via the processor. At 906, a domain relevance of the plurality of candidate sequence patterns to the user is determined, the determination based on interacting with the user via the interactive visual representation. For example, the user may choose at least one sequence pattern of the plurality of candidate sequence patterns. In one example, the user may not choose any sequence pattern of the plurality of candidate sequence patterns. In one example, the user may specify constraints and/or modify a sequence, and prompt the processor to mine the sequence database based on such criteria. As described herein, the domain is an environment associated with the sequence database, and the domain relevance includes semantic and/or contextual knowledge relevant to aspects of the domain.

In one example, the plurality of candidate sequence patterns is ranked, the ranking based on a frequency of occurrence of a sequence pattern in the plurality of input sequences. In one example, the ranker ranks candidate subsequences according to their support, taking into consideration constraints specified by user.

In one example, the determining the domain relevance includes receiving, from the user, a first indication that the user is satisfied with at least one sequence pattern of the plurality of candidate sequence patterns.

In one example, the determining the domain relevance includes receiving, from the user, a second indication that the user is not satisfied with any sequence pattern of the plurality of candidate sequence patterns. In one example, the user may not specify any constraints and/or modified sequence patterns. In one example the interaction processor receives, from the user, a constraint to guide the sequence miner to mine the sequence database. In one example, the constraint may be at least one of a logical constraint and a temporal constraint. The user may specify a constraint based on domain relevance. Accordingly, the user is able to integrate logical and/or temporal constraints based on domain relevance to guide the mining process. In one example, the process ends based on a lack of sequence patterns relevant to the user. For example, the user may specify constraints and no sequence pattern in the plurality of candidate sequence patterns may satisfy the specified constraints.

Examples of the disclosure provide a generalized system for interactive sequential pattern mining. The generalized system provides a visually-guided interactive approach for sequential pattern mining, which enables dynamic integration of domain knowledge (i.e., through user-defined constraints) into the pattern mining process and thus limits the search space and computation to only those that are interesting to domain experts. The generalized system allows an end user to interactively explore and mine interesting patterns from a large number of sequential data. The direction of the mining process depends on the user interactions based on domain expertise and/or domain relevance, thus increasing the interestingness of candidate patterns. Accordingly the results of the mining process may be more meaningful.

Although specific examples have been illustrated and described herein, especially as related to healthcare data, the examples illustrate applications to any structured data. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor;
a sequence database including a plurality of input sequences, wherein each sequence of the plurality of input sequences is an ordered list of events, and each event in the ordered list of events includes at least one item;
a non-transitory computer readable storage medium storing instructions executable by the processor to:
mine the sequence database for a plurality of candidate sequence patterns, the mining based on an interaction with a user, wherein to mine the sequence database, the processor is to:
determine if the plurality of candidate sequence patterns is a null set;
generate and rank a first plurality of sequence patterns by descending support count when the plurality of candidate sequence patterns is a null set;
determine if a constraint set is an empty set when the plurality of candidate sequence patterns is not a null set;
generate and rank a second plurality of sequence patterns by descending support count when the constraint set is an empty set; and
generate and rank a third plurality of sequence patterns that satisfy each constraint in the constraint set when the constraint set is not an empty set;
provide one of the first, second and third ranked plurality of sequence patterns for the interaction with the user; and
process, via the processor, the interaction with the user, the interaction based on a domain relevance of the one of the first, second and third ranked plurality of sequence patterns provided to the user.

2. The system of claim 1, wherein the instructions stored on the non transitory computer readable storage medium are executable by the processor to:
provide, to the user, an interactive visual representation of the provided one of the first, second and third ranked plurality of sequence patterns.

3. The system of claim 1, wherein the instructions stored on the non transitory computer readable storage medium are executable by the processor to:
receive, from the user, an indication that the user is satisfied with at least one sequence pattern of the provided one of the first, second and third ranked plurality of sequence patterns.

4. The system of claim 1, wherein the instructions stored on the non-transitory computer readable storage medium are executable by the processor to:
receive, from the user, an indication that the user is not satisfied with any sequence pattern of the provided one of the first, second and third ranked plurality of sequence patterns.

5. The system of claim 4, wherein the instructions stored on the non-transitory computer readable storage medium are executable by the processor to:
receive, from the user, a constraint to guide the mining of the sequence database.

6. The system of claim 5, wherein the constraint is at least one of a logical constraint and a temporal constraint.

7. The system of claim 4, wherein the instructions stored on the non-transitory computer readable storage medium are executable by the processor to:
receive, from the user, at least one modified sequence pattern from the provided one of the first, second and third ranked plurality of sequence patterns; and mine the sequence database based on the at least one modified sequence pattern.

8. The system of claim rare input data is received via the processor, and further including a data converter to generate the sequence database from the raw input data.

9. The system of claim 1, wherein a given sequence of the plurality of input sequences is associated with at least one of:
a sequence identifier identifying the given sequence,
an event identifier identifying a given event in the ordered list of events associated with the given sequence,
an event time identifier identifying a time when the given event occurred, and
an item identifier associated with the at least one item in the given event.

10. A method to find sequential patterns in a sequence database, the method comprising:
mining, via a processor, a sequence database for a plurality of candidate sequence patterns, the sequence database including a plurality of input sequences, wherein each sequence of the plurality of input sequences is an ordered list of events, and each event in the ordered list of events includes at least one item, wherein the mining of the sequence database further includes:
determining if the plurality of candidate sequence patterns is a null set; and
generating and ranking a first plurality of sequence patterns by descending support count when the plurality of candidate sequence patterns is a null set;
determining if a constraint set is an empty set when the plurality of candidate sequence patterns is not a null set;
generating and ranking a second plurality of sequence patterns by descending support count when the constraint set is an empty set; and
generating and ranking a third plurality of sequence patterns that satisfy each constraint in the constraint set when the constraint set is not an empty set;
providing to a user, via the processor, an interactive visual representation of one of the first, second and third ranked plurality of sequence patterns; and
determining a domain relevance of the one of the first, second and third ranked plurality of sequence patterns provided to the user, the determination based on interacting with the user via the interactive visual representation.

11. The method of claim 10, wherein the determining the domain relevance includes receiving, from the user, an indication that the user is satisfied with at least one sequence pattern of the provided one of the first, second and third ranked plurality of sequence patterns.

12. The method of claim 10, wherein the determining the domain relevance includes receiving, from the user, an indication that the user is not satisfied with any sequence pattern of the provided one of the first, second and third ranked plurality of candidate patterns.

13. A non-transitory computer readable medium comprising machine readable instructions executable by a processor to:
receive a sequence database, the sequence database including a plurality of input sequences, wherein each sequence of the plurality of input sequences is an ordered list of events, and each event in the ordered list of events includes at least one item;
mine the sequence database for a plurality of candidate sequence patterns based on an interaction with a user, wherein to mine the sequence database, the processor is to:
determine if the plurality of candidate sequence patterns is a null set; and
generate and rank a first plurality of sequence patterns by descending support count when the plurality of candidate sequence patterns is a null set;
determine if a constraint set is an empty set when the plurality of candidate sequence patterns is not a null set;
generate and rank a second plurality of sequence patterns by descending support count when the constraint set is an empty set; and
generate and rank a third plurality of sequence patterns that satisfy each constraint in the constraint set when the constraint set is not an empty set; and
process the interaction with the user, the interaction based on an interactive visual representation and a domain relevance of one of the first, second and third ranked plurality of candidate-sequence patterns.

14. The non-transitory computer readable medium of claim 13, wherein:
to process the interaction with the user, the processor is to receive a constraint from the user; and
to mine, the processor is to mine the sequence database based on the constraint.

15. The method of claim 12, further including:
receiving, from the user, at least one modified sequence pattern; and
mining the sequence database based on the at least one modified sequence pattern.

16. The method of claim 10, wherein a given sequence of the plurality of input sequences is associated with at least one of:
a sequence identifier identifying the given sequence,
an event identifier identifying a given event in the ordered list of events associated with the given sequence,
an event time identifier identifying a time when the given event occurred, and
an item identifier associated with the at least one item in the given event.

17. The non-transitory computer readable medium of claim 13, wherein the processor is to further execute the machine-readable instructions to:
receive, from the user, an indication that the user is satisfied with at least one sequence pattern of the one of the first, second and third ranked plurality of sequence patterns.

18. The non-transitory computer readable medium of claim 13, wherein the processor is to further execute the machine-readable instructions to:
receive, from the user, an indication that the user is not satisfied with any sequence pattern of the one of the first, second and third ranked plurality of sequence patterns.

19. The non-transitory computer readable medium of claim 18, wherein the processor is to further execute the machine-readable instructions to:
receive, from the user, at least one modified sequence pattern; and
mine the sequence database based on the at least one modified sequence pattern.

* * * * *